United States Patent Office 2,697,091
Patented Dec. 14, 1954

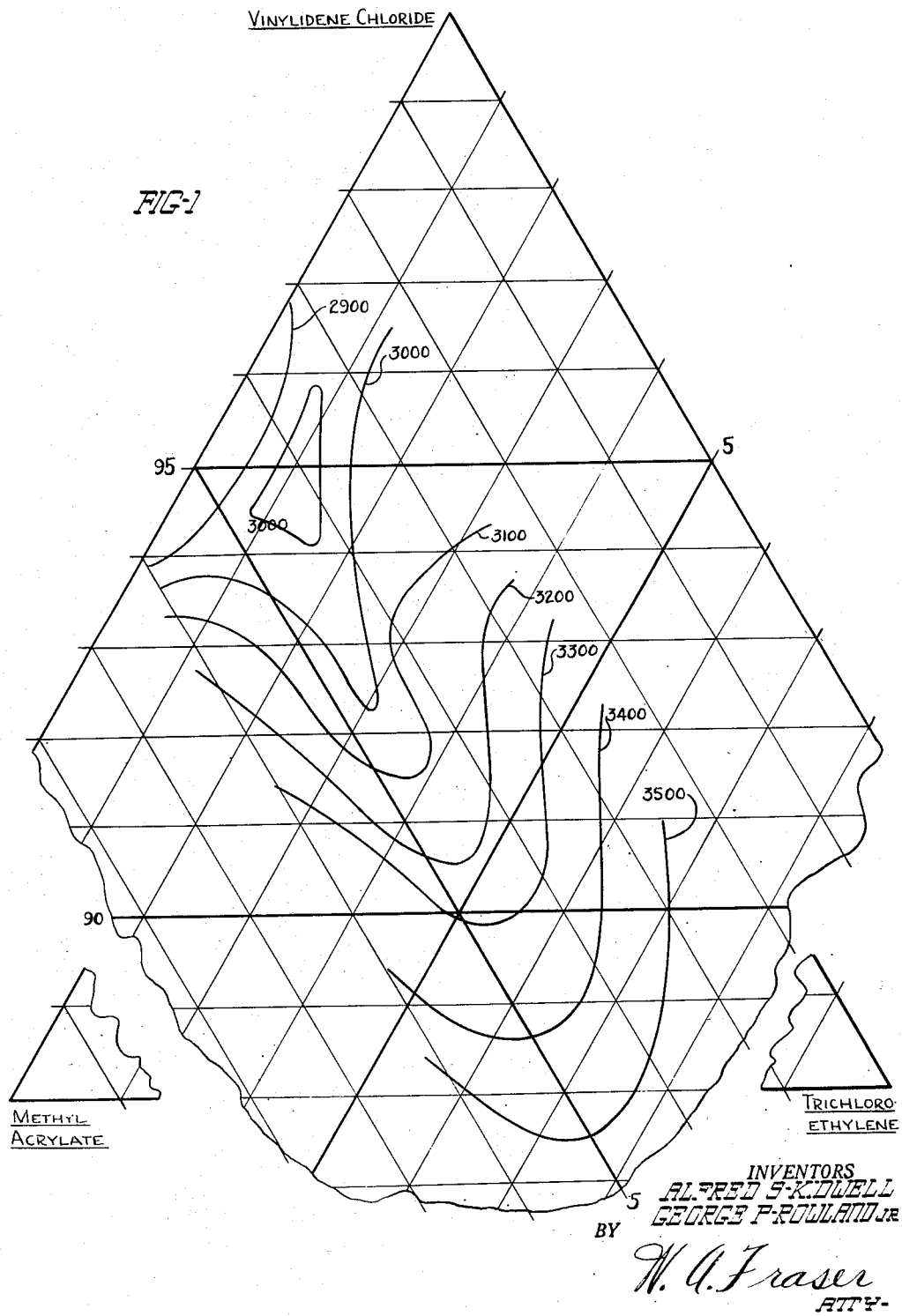

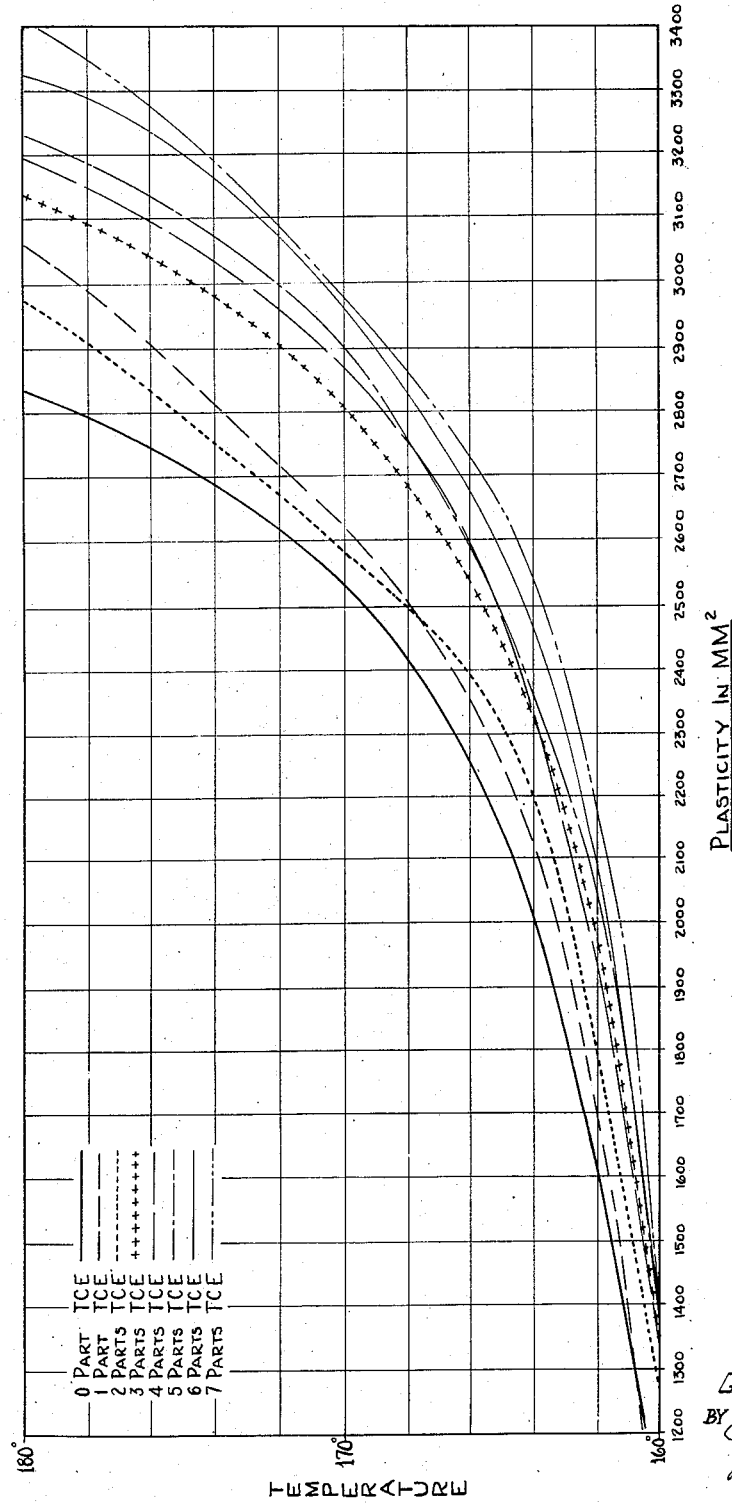

2,697,091

CRYSTALLINE VINYLIDENE CHLORIDE COPOLYMERS

Alfred S. Kidwell, Milford, Conn., and George P. Rowland, Jr., Pottstown, Pa., assignors to The Firestone Tire & Rubber Company, Akron, Ohio, a corporation of Ohio Application March 16, 1953, Serial No. 342,652

13 Claims. (Cl. 260—80.5)

This invention relates to crystalline resinous copolymers of vinylidene chloride, methyl acrylate, and trichloroethylene.

It has heretofore been proposed to copolymerize major proportions of vinylidene chloride with minor proportions of methyl acrylate to produce crystalline resins capable of being extruded and oriented to yield filaments, films, etc. Preliminary investigation of these copolymers brought to light several desirable features, notably a decrease in softening temperature and a relatively slow crystallization rate compared to the vinylidene chloride homopolymer, which properties greatly facilitate processing. These copolymers were found impractical, however, because they had insufficient plasticity at workable extrusion temperatures. Attempts to remedy this defect by incorporating larger proportions of methyl acrylate introduced other difficulties, particularly a tendency of the filaments and films produced from these resins to shrink unduly upon exposure to heat.

Accordingly, it is an object of this invention to provide novel and improved crystalline resinous copolymers of vinylidene chloride.

Another object is to provide resins which will have the advantageous properties of the copolymers of vinylidene chloride and methyl acrylate, and which will additionally have improved plasticity at extrusion temperatures while nevertheless preserving the resistance to heat shrinkage of the oriented filaments produced therefrom.

The invention will be described in connection with the annexed drawings, wherein Fig. 1 is a trilinear chart of the copolymers of this invention, showing contour lines of equal resin plasticity, and Fig. 2 is a graph showing the variation of plasticity with temperature for typical resins of this invention.

SYNOPSIS OF THE INVENTION

The above and other objects are secured, in accordance with this invention, in crystalline resins containing copolymerized therein, in addition to vinylidene chloride and methyl acrylate, a small proportion of trichloroethylene. The resins of this invention have copolymerized therein these three monomers in the following proportions:

*Table I*

| | Parts by weight |
|---|---|
| Vinylidene chloride | 94–97 |
| Methyl acrylate | 3– 6 |
| Trichloroethylene | 1– 7 |

The copolymers within this range combine an advantageous softening temperature, usually in the range 155°–170° C.; a relatively slow rate of crystallization; good plasticity at working temperatures; and resistance to heat-shrinkage in the oriented filaments and films made therefrom. Copolymers containing amounts of methyl acrylate greater than the cited range exhibit undue heat-shrinkage in the oriented crystalline filaments and films made therefrom: those containing less than the cited range of methyl acrylate have unduly high softening points. As little as 1 part by weight of trichloroethylene will effect a worthwhile increase in plasticity; quantities in excess of 7 parts by weight will generally slow down the polymerization reaction to such an extent that further addition would be impractical.

The resins of this invention are produced in accordance with the techniques ordinarily used in preparing polymers and copolymers of vinylidene chloride, by subjecting the mixture of monomers, preferably in the proportions in which they shall be combined in the final resin, to polymerization conditions, either in solution in inert solvents, in emulsion in aqueous media, or in suspension in aqueous media. This last method is preferred, and consists in agitating the liquid monomer with at least an approximately equal volume of an aqueous medium (there is no theoretical upper limit to the amount of aqueous medium). The aqueous medium usually contains a non-micelle-forming emulsifying agent such as gelatin, starch, polyvinyl alcohol or the like, which facilitates breaking up of the monomer into small droplets suspended in the aqueous medium. There will usually be employed a free-radical-generating catalyst which is soluble in the monomer phase, e. g. benzoyl peroxide, 2,4-dichlorobenzoyl peroxide, acetyl peroxide, peracetic acid, lauroyl peroxide, tert-butyl hydroperoxide and the like, such catalysts being characterized generally as oil-soluble free-radical-generating catalysts. The temperature of polymerization will usually be between about 40° C. and about 90° C., or lower than this range if activated catalyst systems are used. The polymerization will ordinarily be carried to a point at which from about 80% to about 95% by weight of the monomers have entered the copolymers. At this point, the polymerization conditions are discontinued and the resultant copolymer is recovered from the reaction mass.

With the foregoing general discussion in mind, there is given herewith a detailed specific example of the practice of this invention. All parts given are by weight.

EXAMPLE

| | Parts |
|---|---|
| Vinylidene chloride | 94–98 |
| Methyl acrylate | [1] 6–2 |
| Trichloroethylene | 1–7 |
| Sodium pyrophosphate | 0.84 |
| Gelatin (250 bloom) | .6 |
| Mixture of: 2,4-dichlorobenzoyl peroxide _____ 1 part<br>Dibutyl phthalate _____ 1 part | 2.0 |
| Water | 200 |

[1] Per Table II.

A series of copolymers was made up in accordance with the foregoing schedule, varying the proportions of the monomers in the different charges as set out in Table II. In the case of each copolymer, all ingredients except the monomers were charged into a polymerization vessel and frozen therein. The vinylidene chloride, methyl acrylate and trichloroethylene, in the proportions selected for that run, were then charged, and the vessel purged with nitrogen and sealed. The vessel was then heated and agitated at 50° C. for 24 hours, at the end of which time the suspension of copolymer and aqueous medium was removed and filtered to separate the resin. The resin was washed on the filter with water, and weighed. The percentage yield was calculated on the basis of the weight of the monomers originally used, and is set forth in Table II along with the proportions of monomer used.

Plasticity determination

The plasticity of each copolymer prepared as above described was determined by placing a 0.5-gram sample of the copolymer between two sheets of cellophane and pressing the assembly in a flat-platen laboratory press at a selected temperature in the range 140°–180° C. under a total load of 2500 pounds for 30 seconds. The area of the resultant plaque, in square millimeters, was recorded as the plasticity of the resin. The plasticities so determined, together with the temperatures at which the test plaques were pressed out, are set forth herewith in Table II.

Extrusion test

| | Parts |
|---|---|
| Copolymer under test | 100 |
| n-Propyl tetrachlorophthalate | 4 |
| p-Tert-butyl salicylate | 2 |
| Glycidyl phenyl ether | 2 |

Each copolymer was tested by extrusion as a filament in the above formulation. In each case, the copolymer under test, and the other ingredients, in the proportions set out in the schedule, were ball-milled together and then extruded in a one-inch laboratory extruder under the following conditions:

| | |
|---|---:|
| Hopper section °F | 90 |
| Rear screw section °F | 338 |
| Front screw section °F | 353 |
| Elbow and die section °F | 358 |
| Die orifice diameter inch | .03 |
| Throughput pounds of resin per hour | 5 |

Extruding into quenching bath at 50° F.
Stretched on orienting rolls having speed ratio of 3.6:1.

The diameter, tensile strength and elongation at break of the filament, and percent shrinkage of the length of the filament in boiling water were determined and are set forth in Table II, along with the monomer ratio of the resin employed.

chloroethylene) are characterized by a much sharper "knee"; the plasticity increases rapidly with temperature in the lower ranges, and more slowly in the higher ranges. This makes possible the formulation of compositions which melt sharply and which have good resistance to shrinkage in boiling water.. The excellent boiling water shrinkage of the resins of this invention will also be seen from Table II.

The upper limit for the methyl acrylate content of the copolymers of this invention is set, amongst other considerations, by a tendency of resins containing more than about 6% of methyl acrylate to exhibit undue shrinkage in boiling water, note Item 33 of Table II, and the tendency in this direction of the border-line compositions of Table II, items 25–32.

From the foregoing general discussion and detailed specific examples, it is evident that this invention provides novel crystalline resinous copolymers of vinylidene chloride having concurrent good properties with respect to

Table II

| Parts by Weight of Monomers Used in Copolymerization | | | Percent Yield of Copolymer | Plasticity of Copolymer Measured at— | | | | Filament Properties | | | | Item No. |
|---|---|---|---|---|---|---|---|---|---|---|---|---|
| Vinylidene Chloride | Methyl Acrylate | Trichloroethylene | | 150° C. | 160° C. | 170° C. | 180° C. | Diameter (inches) | Tensile Strength (pounds per square inch) | Elongation at break (percent) | Shrinkage in boiling water (percent) | |
| 97 | 3 | 0 | 96.3 | ----- | ----- | 2,450 | 2,920 | .0175 | 26,200 | 28 | 8.2 | 1 |
|  |  | 1 | 98.7 | ----- | ----- | 2,120 | 2,980 | ----- | ----- | ----- | ----- | 2 |
|  |  | 2 | 95.0 | ----- | ----- | 2,420 | 3,070 | ----- | ----- | ----- | ----- | 3 |
|  |  | 3 | 99.4 | ----- | ----- | 2,450 | 3,100 | ----- | ----- | ----- | 11.1 | 4 |
|  |  | 4 | 93.5 | ----- | ----- | 2,700 | 3,220 | ----- | ----- | ----- | ----- | 5 |
|  |  | 5 | 92.8 | ----- | ----- | 2,520 | 3,320 | ----- | ----- | ----- | ----- | 6 |
|  |  | 6 | 91.6 | ----- | ----- | 2,600 | 3,430 | ----- | ----- | ----- | ----- | 7 |
|  |  | 7 | 90.0 | ----- | ----- | 2,450 | 3,500 | ----- | ----- | ----- | ----- | 8 |
| 96 | 4 | 0 | 95.2 | ----- | ----- | 2,840 | .0168 | 34,900 | 25 | 10.3 | 9 |
|  |  | 1 | 96.4 | ----- | 1,110 | 3,070 | .0079 | 42,400 | 21 | 14.2 | 10 |
|  |  | 2 | 93.2 | ----- | ----- | 2,980 | ----- | ----- | ----- | 14.5 | 11 |
|  |  | 3 | 95.0 | ----- | ----- | 3,140 | 3,140 | .0152 | 41,400 | 29 | 12.5 | 12 |
|  |  | 4 | 95.0 | ----- | ----- | 3,140 | .0120 | 40,000 | 30 | 14.0 | 13 |
|  |  | 5 | 92.7 | ----- | ----- | 3,240 | .0128 | 43,900 | 28 | 14.0 | 14 |
|  |  | 6 | 91.3 | ----- | ----- | 3,330 | .0095 | 45,800 | 28 | 14.2 | 15 |
|  |  | 7 | 89.6 | ----- | ----- | 3,410 | .0116 | 40,800 | 30 | 13.2 | 16 |
| 95 | 5 | 0 | 96.1 | ----- | 1,980 | 2,480 | 2,810 | .0128 | 33,500 | 27 | 13.2 | 17 |
|  |  | 1 | ----- | ----- | 2,150 | 2,670 | 2,980 | .0113 | 34,600 | 21 | 13.0 | 18 |
|  |  | 2 | 94.8 | ----- | 2,180 | 2,720 | 3,050 | .0139 | 35,760 | 26 | 14.2 | 19 |
|  |  | 3 | 96.0 | ----- | 2,180 | 2,750 | 3,030 | .0135 | 34,700 | 23 | 17.2 | 20 |
|  |  | 4 | 95.0 | ----- | 2,320 | 2,830 | 3,170 | .0120 | 34,000 | 27 | 20.0 | 21 |
|  |  | 5 | 94.0 | ----- | 2,420 | 2,930 | 3,270 | .0112 | 31,900 | 23 | 16.5 | 22 |
|  |  | 6 | 92.5 | ----- | 2,450 | 2,960 | 3,360 | .0120 | 30,800 | 23 | 22.2 | 23 |
|  |  | 7 | 93.5 | ----- | 2,520 | 3,075 | 3,430 | .0117 | 30,300 | 27 | 23.0 | 24 |
|  |  |  |  |  |  |  |  |  |  |  | 23.0 | 25 |
| 94 | 6 | 0 | 96.5 | 1,210 | 2,120 | 2,550 | 2,880 | ----- | ----- | ----- | 24.5 | 26 |
|  |  | 1 | 99.0 | 1,020 | 2,410 | 2,820 | 3,150 | .0172 | 31,300 | 25 | 25.0 | 27 |
|  |  | 2 | 98.2 | 1,060 | 2,480 | 2,930 | 3,230 | .0160 | 36,500 | 23 | 21.5 | 28 |
|  |  | 3 | 95.5 | 1,300 | 2,530 | 2,970 | 3,340 | .0133 | 28,900 | 28 | 24.3 | 29 |
|  |  | 4 | 98.8 | 1,300 | 2,600 | 3,020 | 3,450 | .0137 | 27,100 | 24 | 29.0 | 30 |
|  |  | 5 | 94.6 | 1,020 | 2,610 | 3,180 | 3,390 | .0140 | 29,100 | 23 | 29.8 | 31 |
|  |  | 6 | 94.0 | 1,020 | 2,640 | 3,150 | 3,510 | .0127 | 31,100 | 26 | 28.3 | 32 |
|  |  | 7 | 91.7 | 1,020 | 2,780 | 3,230 | 3,550 | .0128 | 24,300 | 26 | 40.0 | |
| 93 | 7 | 0 | 99.3 | 1,720 | 2,050 | 2,380 | 2,640 | .0166 | 22,700 | 50 | | 33 |

The monomer compositions of the copolymers of this invention are plotted on the fragmentary trilinear diagram of Fig. 1, wherein the upper vertex represents vinylidene chloride, the left-hand lower vertex (off scale) represents methyl acrylate and the right-hand lower vertex (off scale) represents trichloroethylene. The contour lines are those of equal plasticity of the resin, the figures adjacent the contour lines denoting the plasticity of the resins determined by the method described above, with a press temperature of 180° C. It will be seen that the methyl acrylate does not impart any great degree of plasticity to the resin, the principal gain in this property being achieved by crossing the contour lines in a direction away from the vinylidene chloride-methyl acrylate base line. The methyl acrylate is, of course, essential to the resins in other respects, namely a workable softening point and favorable yield in the polymerization reaction.

Fig. 2 is a plot of plasticity against temperature for the series of resins (items Nos. 9–16 of Table II) containing 96 parts of vinylidene chloride, 4 parts of methyl acrylate, and 1–7 parts of trichloroethylene. Each curve represents one resin, (containing copolymerized therein the proportions of monomers as indicated in the legend) the ordinates of the curve representing the plasticity of the resin and the abscissae representing the temperature at which the plasticity is determined, using the method described above. It will be seen that the curves representing the resins of this invention (i. e. those containing trichloroethylene) are characterized by a much sharper softening point and plasticity of the resins themselves, and boiling water shrinkage resistance of the oriented filaments produced therefrom. The necessary starting materials, vinylidene chloride, methyl acrylate and trichloroethylene are all readily available.

What is claimed is:

1. A crystalline resinous copolymer of:

| | Parts by weight |
|---|---:|
| Vinylidene chloride | 94–97 |
| Methyl acrylate | 3–6 |
| Trichloroethylene | 1–7 |

2. A crystalline resinous copolymer of:

| | Parts by weight |
|---|---:|
| Vinylidene chloride | 96 |
| Methyl acrylate | 4 |
| Trichloroethylene | 2 |

3. A crystalline resinous copolymer of:

| | Parts by weight |
|---|---:|
| Vinylidene chloride | 96 |
| Methyl acrylate | 4 |
| Trichloroethylene | 5 |

4. A crystalline resinous copolymer of:

| | Parts by weight |
|---|---:|
| Vinylidene chloride | 96 |
| Methyl acrylate | 4 |
| Trichloroethylene | 7 |

5. A crystalline resinous copolymer of:

| | Parts by weight |
|---|---|
| Vinylidene chloride | 94 |
| Methyl acrylate | 6 |
| Trichloroethylene | 1 |

6. A crystalline resinous copolymer of:

| | Parts by weight |
|---|---|
| Vinylidene chloride | 97 |
| Methyl acrylate | 3 |
| Trichloroethylene | 7 |

7. Process which comprises copolymerizing, in aqueous suspension and in the presence of a free-radical-generating catalyst which is soluble in the monomer phase, at temperatures in the range of 40° C.–90° C.:

| | Parts by weight |
|---|---|
| Vinylidene chloride | 94–97 |
| Methyl acrylate | 3– 6 |
| Trichloroethylene | 1– 7 |

8. Process which comprises copolymerizing, in aqueous suspension and in the presence of a free-radical-yielding catalyst which is soluble in the monomer phase, at temperatures in the range of 40° C.–90° C.:

| | Parts by weight |
|---|---|
| Vinylidene chloride | 96 |
| Methyl acrylate | 4 |
| Trichloroethylene | 2 |

9. Process which comprises copolymerizing, in aqueous suspension and in the presence of a free-radical-yielding catalyst which is soluble in the monomer phase, at temperatures in the range of 40° C.–90° C.:

| | Parts by weight |
|---|---|
| Vinylidene chloride | 96 |
| Methyl acrylate | 4 |
| Trichloroethylene | 5 |

10. Process which comprises copolymerizing, in aqueous suspension and in the presence of a free-radical-yielding catalyst which is soluble in the monomer phase, at temperatures in the range of 40° C.–90° C.:

| | Parts by weight |
|---|---|
| Vinylidene chloride | 96 |
| Methyl acrylate | 4 |
| Trichloroethylene | 7 |

11. Process which comprises copolymerizing, in aqueous suspension and in the presence of a free-radical-yielding catalyst which is soluble in the monomer phase, at temperatures in the range of 40° C.–90° C.:

| | Parts by weight |
|---|---|
| Vinylidene chloride | 94 |
| Methyl acrylate | 6 |
| Trichloroethylene | 1 |

12. Process which comprises copolymerizing, in aqueous suspension and in the presence of a free-radical-yielding catalyst which is soluble in the monomer phase, at temperatures in the range of 40° C.–90° C.:

| | Parts by weight |
|---|---|
| Vinylidene chloride | 97 |
| Methyl acrylate | 3 |
| Trichloroethylene | 7 |

13. An oriented crystalline filament characterized by high resistance to shrinkage in boiling water, said filament being formed of a copolymer of:

| | Parts by weight |
|---|---|
| Vinylidene chloride | 94–97 |
| Methyl acrylate | 3– 6 |
| Trichloroethylene | 1– 7 |

No references cited.